United States Patent [19]

Geller et al.

[11] Patent Number: 5,154,096
[45] Date of Patent: Oct. 13, 1992

[54] GUIDANCE APPARATUS FOR BICYCLE TRAINING

[76] Inventors: Rami Geller, 1173 Glen Ave., Berkeley, Calif. 94108; Avry Dotan, 7444 Potrero Ave., El Cerrito, Calif. 94530

[21] Appl. No.: 696,790

[22] Filed: May 7, 1991

[51] Int. Cl.⁵ .................... B62K 21/21; B62K 19/30
[52] U.S. Cl. .................... 74/551.8; 74/102.2; 280/293; 280/273; 280/288.4
[58] Field of Search ............ 74/551.1, 551.8, 502.2; 180/77 C; 280/288.4, 293, 273, 1.13

[56] References Cited

U.S. PATENT DOCUMENTS

| | | | |
|---|---|---|---|
| 2,672,351 | 3/1954 | Kane | 280/288.4 |
| 2,816,775 | 2/1955 | Costello | 74/551.8 |
| 3,336,048 | 6/1965 | Papacki | 74/551.1 |
| 3,935,916 | 2/1976 | Ferraro | 280/273 X |
| 3,964,564 | 6/1976 | Pittarelli | 74/551.1 X |
| 4,005,874 | 2/1979 | Ohtani | 280/288.4 |
| 4,917,398 | 4/1990 | de Miranda Pinto | 280/293 |
| 5,028,066 | 7/1991 | Garth | 280/293 X |

FOREIGN PATENT DOCUMENTS

| | | | |
|---|---|---|---|
| 2830561 | 1/1980 | Fed. Rep. of Germany | 280/293 |
| 2512767 | 3/1983 | France | 280/293 |

*Primary Examiner*—David A. Scherbel
*Assistant Examiner*—Winnie Yip

[57] ABSTRACT

Guidance apparatus for bicycle training allowing supervising adult to control the balance of inexperience bicycle rider, comprising a elongated tubular shaft having a top and bottom end, said bottom end including means to fixedly secured the latter to the rear portion of a bicycle frame with said top end extending substantially behind above the bicycle seat, an elongated handle element mounted on said top end of said shaft so as to be able to adjust the balance of rider on said bicycle by lateral movement of said handle and to provide with safety feature to control the motion of said rider by holding on to said handle or by using standard bicycle hand-brake system connected to said shaft.

1 Claim, 2 Drawing Sheets

GUIDANCE APPARATUS FOR BICYCLE TRAINING

BACKGROUND—FIELD OF INVENTION.

This invention relates to bicycles, specifically a device for assisting in the training of bicycle riding.

BACKGROUND—DESCRIPTION OF PRIOR ART.

Riding a bicycle involves a learning process. Children often start this process by riding on a tricycle which provides them with the first notion of pedaling and steering. The next step usually involves the experience of riding a bicycle with training wheels. The intended purpose of training wheels is to give the child the perception of safety while learning to control his/her balance when riding on two wheels.

Many people believe that the training wheels may have an adverse effect on the learning curve of riding a bicycle. The child often tends to rely on the training wheels and leans to one side of the bicycle, thus acquiring the habit of riding the bicycle without learning to balance. Therefore, it is a common practice to remove the training wheels of the bicycle and train the child to ride on two wheels while holding on to the bicycle seat. The grip of the bicycle seat is usually an uncomfortable position for the supervising adult and provides limited control of the bicycle. This method of training can sometimes compromise the safety of the child.

We have conducted an extensive research of training devices for bicycle riding. Our finding is that the only devise is training wheels. Several tricycle guiders have been proposed- for example, in U.S. Pat. No. 2,816,775 and U.S. Pat. No. 3,336,048. These patents are related to tricycles only and are comprised of a guidance apparatus which connects to the front handlebars of the tricycle. The main objective of these patents is to control the steering of the tricycle. The objective and functionality of the above mentioned patents differ from our invention and therefore, to the best of our knowledge, cannot be considered as competitive inventions.

OBJECTS AND ADVANTAGES.

Our invention, explained in detailed in Section (g), is a bicycle riding training device which consists of a guidance apparatus in the form of a handle equipped with a hand-brake(optional) and connects to the rear portion of the bicycle. This handle allows the supervising adult to control the child's bicycle while the child learns how to balance him/herself when riding on two wheels.

Several objects and advantages of our invention are:
1. To provide with a comfortable grip of the bicycle by using elevated handle.
2. To provide with full control of the bicycle by connecting close to the center of gravity of the bicycle.
3. To provide an immediate response to correct an abrupt tilt of the bicycle.
4. To provide a safety feature to control the bicycle when going downhill or to stop the bicycle in case of emergency.
5. To allow the child to build up his/her riding skills gradually without the need to disconnect the device from the bicycle.

DRAWING FIGURES

REFERENCE NUMERICAL IN DRAWINGS

10—Elongated tubular shaft.
11—Plastic cap
12—Rubber layer
15—Handle
20—U-shaped bolts
21—U-shaped brackets
22—Lock nuts
23—Lock nut
25—Eye bolt
26—Bolt
30—Seat tube
31—Brake bridge
40—Standard bicycle hand-brake system

DESCRIPTION—STRUCTURE OF INVENTION

Figure 1:
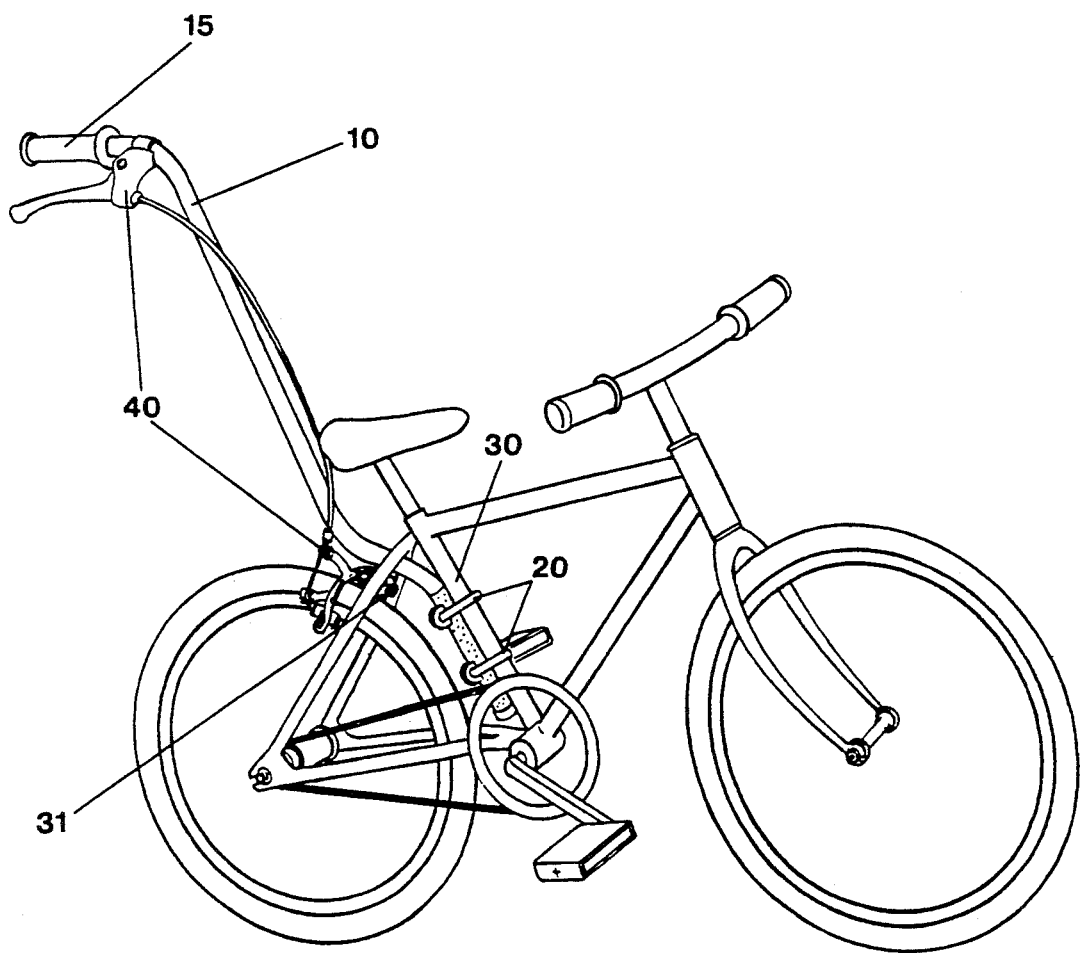
FIG. 1 shows a perspective view of the guidance apparatus mounted on a bicycle.

A typical embodiment of the guidance apparatus is illustrated in FIG. 1 (perspective view).

The guidance apparatus consists of an elongated tubular shaft 10 fixedly secured at the lower end to the bicycle's seat tube 30 and to the brake bridge 31 and equipped with a handle 15 at the upper end. A standard bicycle hand-brake system 40 (optional) can be connected to the shaft as illustrated in FIG. 1.

Figure 2:
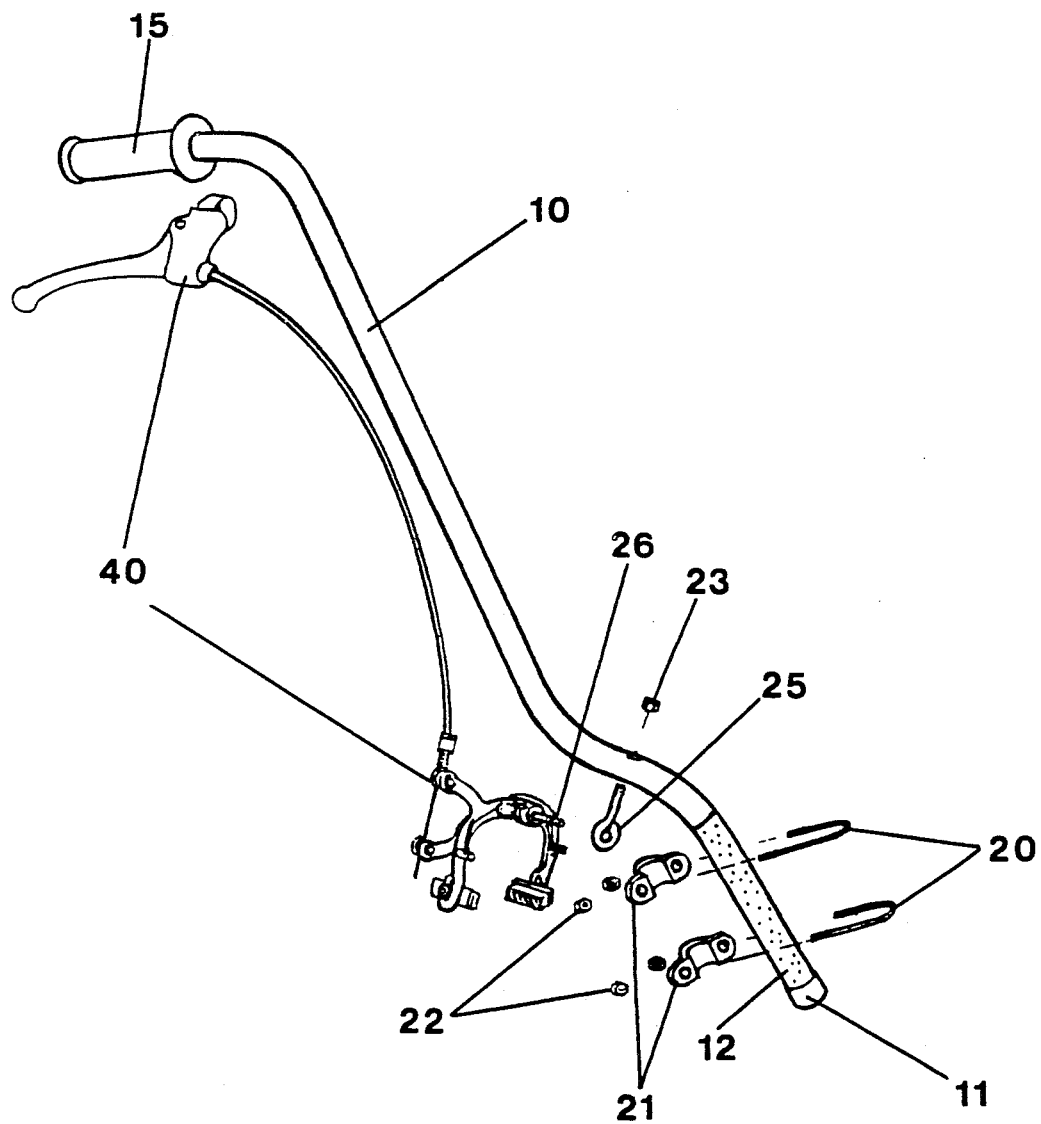
FIG. 2 shows exploded views of the connections of the guidance apparatus to the seat tube and to the brake bridge of a bicycle.

Typical connections and the parts of the guidance apparatus are depicted in FIG. 2 (exploded view).

The connection of the shaft to the bicycle's seat tube 30 is with two U-shaped bolts 20 which couple the lower end of the shaft 10 to the seat tube using two U-shaped brackets 21 secured by two lock nuts 22. The lower end of the shaft 10 is coated with thin layer of rubber 12 and equipped with plastic cap 11 at the bottom. The connection of the shaft 10 to the bicycle brake bridge 31 is with a single Eye bolt 25 inserted and fixedly secured with a lock nut 23 to the shaft 10, on one end, and fixedly secured with a bolt 26 to the bicycle brake bridge 31, on the other end. The same bolt 26 can also be used to connect standard bicycle hand-brake system 40 (optional) to the bicycle brake bridge 31.

DESCRIPTION—OPERATION OF INVENTION

Once the guidance apparatus is mounted to the bicycle, the supervising adults holds on to the handle 15 and helps the child to balance him/herself while riding the bicycle. The guidance apparatus allows the supervising adult to correct an abrupt tilt of the bicycle by controlling the balance of the child with lateral movement of the handle 15. In case of emergency the supervising adult can slow down or stop the bicycle by pulling the handle 15 back or by using standard bicycle hand-brake system 40 (optional).

SUMMARY, RAMIFICATIONS, AND SCOPE

Accordingly, the guidance apparatus provides new means for training children in bicycle riding. It provides the child with the right notion of riding a bicycle on two wheels, provides the child with the sense of safety while learning to balance him/herself, allows the supervising adult with comfortable grip and full control of the bicycle, provides with safety measure to stop the bicycle in case of emergency and overall reduces the time require to learn how to ride a bicycle.

We claim:

1. A device in combination with a bicycle frame having a break-bridge and a seat-tube for training in bicycle riding. comprising:
   (a) an elongated shaft having a lower end and a upper end;
   (b) means for connecting the lower end of said shaft to said seat-tube and said brake-bridge of said bicycle frame;
   (c) an elongated handle element mounted on said upper end of said shaft, for supervising adult being able to adjust the balance of a rider by lateral movement of said handle;
   (d) an auxiliary hand-brake system comprising a rear-brake unit connected to said brake-bridge;
   (e) a hand-brake lever connected to said rear-brake unit via a cable and mounted on said upper end of said shaft for providing safety for supervising adult being able to stop the bicycle in case of emergency.

* * * * *